United States Patent
Tran et al.

(10) Patent No.: US 9,884,555 B2
(45) Date of Patent: Feb. 6, 2018

(54) VEHICLE CONTROL SYSTEM

(75) Inventors: Thuy-Yung Tran, Coventry (GB); Edward Hoare, Coventry (GB); Nigel Clarke, Coventry (GB)

(73) Assignee: Jaguar Land Rover Limited, Whitley, Coventry, Warwickshire (GB)

( * ) Notice: Subject to any disclaimer, the term of this patent is extended or adjusted under 35 U.S.C. 154(b) by 147 days.

(21) Appl. No.: 13/994,504

(22) PCT Filed: Dec. 15, 2011

(86) PCT No.: PCT/EP2011/072986
§ 371 (c)(1),
(2), (4) Date: Jul. 24, 2013

(87) PCT Pub. No.: WO2012/080429
PCT Pub. Date: Jun. 21, 2012

(65) Prior Publication Data
US 2014/0156126 A1    Jun. 5, 2014

(30) Foreign Application Priority Data

Dec. 15, 2010 (GB) .................................. 1021268.6
Dec. 15, 2010 (GB) .................................. 1021272.8
(Continued)

(51) Int. Cl.
*B60R 99/00*    (2009.01)
*B60K 35/00*    (2006.01)
(Continued)

(52) U.S. Cl.
CPC ............ *B60K 35/00* (2013.01); *B60G 17/019* (2013.01); *B60G 17/0165* (2013.01);
(Continued)

(58) Field of Classification Search
CPC ....... B60K 28/00; B60G 17/015; G01F 23/14; B60R 99/00; Y01S 903/93
(Continued)

(56) References Cited

U.S. PATENT DOCUMENTS 3,392,694 A    7/1968    Appleton
4,107,994 A    8/1978    Sogo
(Continued)

FOREIGN PATENT DOCUMENTS

DE    19941126 A1    4/2001
DE    102004028157 B3    1/2006
(Continued)

OTHER PUBLICATIONS

B. Stadius, "Off Road Driving Manual 2010", Jan. 1, 2010, Retrieved Dec. 13, 2016, document located at http://sdt4x4.co.uk/resources/Off%20Road%20Driving%20book.pdf.*
(Continued)

*Primary Examiner* — Yonel Beaulieu
*Assistant Examiner* — Martin A Weeks
(74) *Attorney, Agent, or Firm* — Reising Ethington P.C.

(57) ABSTRACT

A vehicle having a wading sensor may include a control unit adapted to implement an alternative or modified vehicle control strategy during wading. The wading strategy may change many vehicle functions, alone or in combination, and may be further responsive to depth of wading.

17 Claims, 1 Drawing Sheet

(30) Foreign Application Priority Data

| Dec. 15, 2010 | (GB) | ................................... | 1021278.5 |
| Dec. 15, 2010 | (GB) | ................................... | 1021295.9 |
| Dec. 15, 2010 | (GB) | ................................... | 1021296.7 |
| Dec. 15, 2010 | (GB) | ................................... | 1021297.5 |

(51) Int. Cl.

| G01F 23/28 | (2006.01) |
| B60G 17/019 | (2006.01) |
| G01F 23/18 | (2006.01) |
| B60G 17/0165 | (2006.01) |
| B60W 40/06 | (2012.01) |
| B60W 40/076 | (2012.01) |
| B60W 50/14 | (2012.01) |
| G01F 23/00 | (2006.01) |
| G01F 23/296 | (2006.01) |
| B60K 37/02 | (2006.01) |
| F02D 11/10 | (2006.01) |
| G01F 23/14 | (2006.01) |
| G01S 15/02 | (2006.01) |
| G10K 13/00 | (2006.01) |
| B60Q 1/00 | (2006.01) |
| G01F 23/24 | (2006.01) |
| G01F 23/26 | (2006.01) |
| G06F 7/00 | (2006.01) |
| G01K 13/00 | (2006.01) |
| G01S 15/93 | (2006.01) |
| G01S 15/87 | (2006.01) |

(52) U.S. Cl.
CPC ........ *B60G 17/01908* (2013.01); *B60K 37/02* (2013.01); *B60Q 1/00* (2013.01); *B60R 99/00* (2013.01); *B60W 40/06* (2013.01); *B60W 40/076* (2013.01); *B60W 50/14* (2013.01); *F02D 11/105* (2013.01); *G01F 23/0061* (2013.01); *G01F 23/0076* (2013.01); *G01F 23/14* (2013.01); *G01F 23/18* (2013.01); *G01F 23/24* (2013.01); *G01F 23/242* (2013.01); *G01F 23/263* (2013.01); *G01F 23/265* (2013.01); *G01F 23/28* (2013.01); *G01F 23/2965* (2013.01); *G01K 13/00* (2013.01); *G01S 15/02* (2013.01); *G01S 15/87* (2013.01); *G01S 15/931* (2013.01); *G06F 7/00* (2013.01); *G10K 13/00* (2013.01); *B60G 2300/07* (2013.01); *B60G 2400/80* (2013.01); *B60G 2400/843* (2013.01); *B60G 2500/30* (2013.01); *B60G 2800/914* (2013.01); *B60K 2350/1076* (2013.01); *B60W 2050/146* (2013.01); *B60W 2420/54* (2013.01); *B60W 2520/16* (2013.01); *B60W 2520/18* (2013.01); *B60W 2550/14* (2013.01); *B60W 2550/142* (2013.01); *B60W 2550/147* (2013.01); *G01F 23/00* (2013.01); *G01F 23/296* (2013.01); *G01S 2015/932* (2013.01); *G01S 2015/938* (2013.01); *Y02T 10/84* (2013.01); *Y10S 367/908* (2013.01); *Y10S 903/93* (2013.01)

(58) Field of Classification Search
USPC .......................................................... 701/22
See application file for complete search history.

(56) References Cited

U.S. PATENT DOCUMENTS

| 4,144,517 | A | | 3/1979 | Baumoel | |
| 5,173,692 | A | | 12/1992 | Shapiro et al. | |
| 5,521,594 | A | | 5/1996 | Fukushima | |
| 5,978,736 | A | * | 11/1999 | Greendale | 701/300 |
| 6,430,985 | B1 | * | 8/2002 | Drees | 73/1.34 |
| 7,006,881 | B1 | * | 2/2006 | Hoffberg | G05B 15/02 |
| | | | | | 700/17 |
| 8,473,173 | B1 | | 6/2013 | Robles | |
| 9,026,310 | B2 | | 5/2015 | Tran et al. | |
| 2003/0005765 | A1 | | 1/2003 | Brudis et al. | |
| 2005/0170710 | A1 | | 8/2005 | Darby et al. | |
| 2005/0284218 | A1 | | 12/2005 | Lagergren | |
| 2006/0113129 | A1 | * | 6/2006 | Tabata | 180/65.2 |
| 2007/0007056 | A1 | * | 1/2007 | Bowers et al. | 180/65.2 |
| 2007/0167092 | A1 | * | 7/2007 | Rees et al. | 440/12.54 |
| 2007/0221430 | A1 | * | 9/2007 | Allison, Sr. | 180/299 |
| 2007/0244606 | A1 | * | 10/2007 | Zhang et al. | 701/1 |
| 2008/0030313 | A1 | | 2/2008 | Obradovich | |
| 2008/0319618 | A1 | * | 12/2008 | Sjogren et al. | 701/50 |
| 2009/0030581 | A1 | | 1/2009 | Pollklas et al. | |
| 2009/0150035 | A1 | * | 6/2009 | Soliman et al. | 701/54 |
| 2009/0159020 | A1 | | 6/2009 | Hall et al. | |
| 2010/0057324 | A1 | * | 3/2010 | Glugla et al. | 701/102 |
| 2010/0085198 | A1 | | 4/2010 | Boss et al. | |
| 2010/0101226 | A1 | * | 4/2010 | Shutty et al. | 60/602 |
| 2013/0307679 | A1 | | 11/2013 | Tran et al. | |
| 2013/0336090 | A1 | | 12/2013 | Tran et al. | |
| 2014/0085066 | A1 | | 3/2014 | Tran et al. | |
| 2014/0184247 | A1 | | 7/2014 | Tran et al. | |
| 2014/0288793 | A1 | | 9/2014 | Tran et al. | |
| 2014/0293746 | A1 | | 10/2014 | Tran et al. | |
| 2014/0347178 | A1 | | 11/2014 | Tran et al. | |
| 2015/0033846 | A1 | | 2/2015 | Tran et al. | |

FOREIGN PATENT DOCUMENTS

| DE | 102005038345 A1 | 2/2007 |
| DE | 102008042016 A1 | 3/2010 |
| FR | 2622639 A1 | 5/1989 |
| GB | 2356602 A | 5/2001 |
| GB | 2376929 A | 12/2002 |
| KR | 1020110109614 | 10/2011 |
| KR | 1020110109618 | 10/2011 |
| NL | 1011780 C2 | 10/2000 |
| RU | 2168419 C1 | 6/2001 |
| WO | 03002378 A1 | 1/2003 |
| WO | 2009013606 A2 | 1/2009 |

OTHER PUBLICATIONS

International Search Report for PCT/EP2011/072986 dated May 16, 2012, 6 pages.

Search Report corresponding to application No. GB1121624.9, dated Apr. 10, 2012, 7 pages.

* cited by examiner

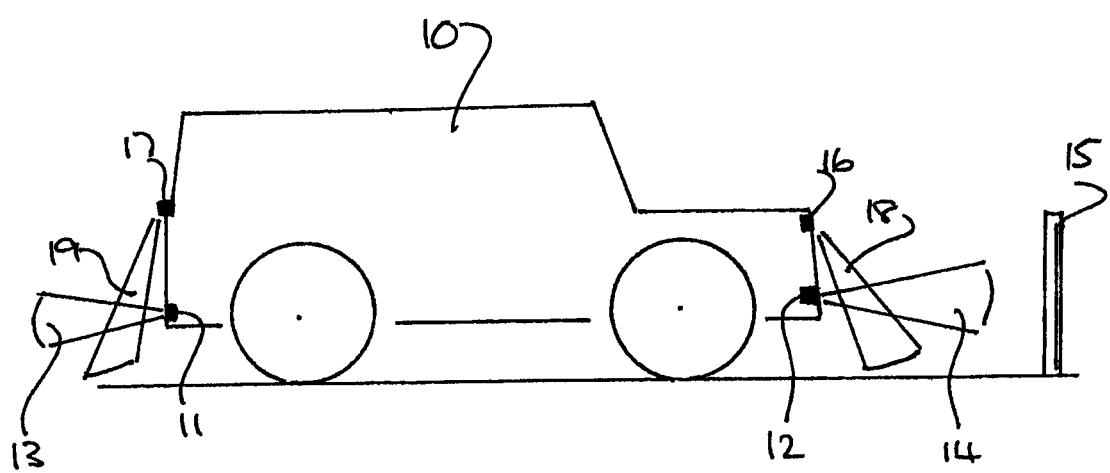

VEHICLE CONTROL SYSTEM

TECHNICAL FIELD

The present invention relates to a vehicle control system and particularly, but not exclusively, to a system adapted to a wading vehicle. Aspects of the invention relate to a system, to a method and to a vehicle.

BACKGROUND

Road vehicles are designed to wade through water at a prescribed depth, according to the vehicle make and model. Vehicles with off-road capability may be designed to wade in a depth of water (e.g. over 300 mm), and are typically provided with appropriate protection of the vehicle engine, electrical systems and the like.

It may be advantageous to take some actions consequent upon detection of wading, so as to place the vehicle in a state better suited to wading. WO-A-03/002378 discloses a system relevant to the present invention.

SUMMARY

Aspects of the invention relate to a vehicle, a method and a control system as claimed in the appended claims.

According to one aspect of the present invention for which protection is sought, there is provided a control system of a vehicle having a wading sensor adapted to identify wading above a predetermined depth of water, said control system being adapted to implement one or more of the following vehicle control strategies upon detection of wading by said sensor:
  change of traction mode
  change of throttle mapping
  change of gear selection mode
  change of high/low range mode
  activate headlights
  select higher air intake path
  adapt tyre pressures to wading
  change steering response/feel
  change differential control
  change torque-vectoring control
  change hybrid vehicle drive mode
  activate heating, ventilation and air conditioning system (HVAC)
  delay regeneration of exhaust particle filter
  partially flood a pre-determined portion of the vehicle
  unlock one or more door locks
  open one or more windows
  open sun roof.

In an embodiment the control system implements an alternative control strategy selected from:
  activate hydraulic lock sensor of engine, and
  de-activate engine fuel saving mode.

Optionally, the control system is adapted to be manually enabled and disabled by the driver.

Alternatively, the control system is adapted to be automatically enabled and disabled.

The vehicle control system may be further adapted to re-implement a standard control strategy upon a failure to detect wading by said sensor. A plurality of wading sensors may be provided, and may operate individually or in conjunction to indicate wading.

The mode of operation of the sensor may be adapted to a selected operational mode of the vehicle. For example an off-road traction mode may elicit a different sensor response as compared with an on-road (normal) traction mode, and enable an alternative control strategy.

In this specification a standard control strategy includes any control strategy appropriate to vehicle operation when wading is not indicated.

A suitable sensor is any sensor capable of detecting water at wading depth, and includes sensors responsive to contact with water; sensors operate to sense water by transmission and reflection of a waveform; camera detectors, including computer vision apparatus; and GPS or like geographical data sensors.

Such sensors may be used in combination if required. Such sensors are typically vehicle mounted.

The control strategies implemented by the control system are typically retained in a memory of the vehicle control system, and may be in a look-up table with reference to other vehicle control inputs. Thus, for example, a change of control strategy may be dependent upon the depth of wading, for which purpose a wading depth sensor of any suitable kind may be provided on the vehicle. The wading depth sensor may be enabled only whilst wading is indicated by a wading sensor.

A change of control strategy may be implemented immediately or progressively. Progressive implementation allows a driver to become familiar with, for example, a change in response to a given driver input. The control system may acquire historical data concerning wading events, and apply that data to a new wading event so as to improve decision making and implementation of a control strategy.

A change in control strategy may also be implemented with delay according to the parameters retained in a memory, or according to other vehicle control inputs. Thus for example the HVAC system may remain enabled for a period after a failure to detect wading. Such an arrangement may be useful in passage through successive stretches of shallow water, or to allow the effects of wading to be fully cleared before resumption of a standard control strategy.

Optionally, the time delay is dependent upon the strategy to be implemented. In some embodiments the rate of change of control strategy is dependent upon the strategy to be implemented.

Optionally, the control system comprises a wading depth sensor, said control system being responsive to said depth sensor to implement said one or more control strategies dependent upon depth of wading. The control system may be arranged to vary a control strategy according to step changes in depth of wading.

In embodiments of the invention the control strategies are defined in a read only memory.

According to another aspect of the present invention there is provided a vehicle having a control system as described hereinabove.

According to a further aspect of the present invention there is provided a vehicle comprising a control system and a sensor adapted to identify wading above a predetermined depth of water, the control system being adapted to implement a change in one or more vehicle control strategies upon detection of wading by said sensor.

According to a yet another aspect of the present invention there is provided a method for a vehicle comprising receiving data from a sensor adapted to indicate wading above a pre-determined depth of water, determining that the vehicle is wading; and implementing one or more vehicle control strategies in response to determining that the vehicle is wading, said strategies being selected from:
  change of traction mode;
  change of throttle mapping;

change of gear selection mode;
change of high/low range mode;
activate headlights;
select higher air intake path;
adapt tyre pressures to wading;
change steering response/feel;
change differential control;
change torque-vectoring control;
change hybrid vehicle drive mode;
activate heating, ventilation and air conditioning system (HVAC);
delay regeneration of exhaust particle filter;
partially flood a pre-determined portion of the vehicle;
unlock one or more door locks;
open one or more windows; and
open sun roof.

In an embodiment the method comprises implementing an alternative control strategy selected from:
activate hydraulic lock sensor of engine, and
de-activate engine fuel saving mode.

Optionally, the method comprises receiving data from the sensor, determining that the vehicle is not wading and resuming, automatically, a standard or different control strategy, The sensor(s) used in the invention are mounted appropriately on the vehicle. Thus a water contact sensor is typically provided at a lower vehicle extremity, at the front and at the rear. A GPS receiver is typically upward facing.

Within the scope of this application it is envisaged that the various aspects, embodiments, examples, features and alternatives set out in the preceding paragraphs, in the claims and/or in the following description and drawings may be taken independently or in any combination thereof. For example, features described with reference to one embodiment are applicable to all embodiments unless there is incompatibility of features.

Further aspects of the invention are now described independently of each other aspect. The aspects may be combined, as desired.

Change of Terrain Response Mode

A vehicle with off-road capability may have a driver switchable control for automatically placing the vehicle in best operating mode according to the terrain over which the vehicle is travelling. Thus a driver may be able to switch between road, mud and snow, sand, and rock crawl modes, each of which will modify the vehicle response so as to enable the vehicle to best perform within the full available operating envelope.

According to this aspect of the invention, upon detection of wading, the control system may automatically implement a Terrain Response mode, such as rock crawl. This arrangement provides better vehicle performance for the inexperienced driver, and may protect the vehicle from damage. The cost of implementation is minimal where Terrain Response is already provided on the vehicle.

In an enhancement, the control system may present the driver with a choice of modes, for example rock crawl and sand, or default to the best mode indicated by other vehicle sensors. For example wheel slip sensors may provide information on wheel grip, and thus whether rock climb mode or mud and snow mode is appropriate. The control system may include a driver override.

Change Throttle Mapping

Upon detection of wading, the control system may implement a throttle map better suited to driving in water. Thus, to permit better control of engine revolutions, the throttle map may limit maximum engine revolutions and/or increase throttle pedal travel for a given engine response. Minimum engine speed may be raised to ensure positive exhaust pressure whilst under water.

Change Gear Selection

Upon detection of wading the control system may inhibit the selection of certain gear ratios, alter the speeds at which automatic ratio changes occur, or select an appropriate (low) ratio. This arrangement can avoid loss of drive as gear ratios change, or are changed, during wading, and also promotes driver confidence. An indicator to the driver may show, for example, a locked or selected gear ratio.

High/Low Range Mode

Similarly a manual or automatic change of speed range may be inhibited or prohibited, or a range may be automatically selected, typically low range in a dual range transmission.

Headlight Activation

Headlights may be activated upon detection of wading.

Select Higher Intake Path

Upon detection of wading, a higher air intake path may be selected for the engine and/or HVAC system. The intake path may for example comprise upper and lower paths and an electronically controlled flap or butterfly valve to select one or other path on demand.

Adapt Tyre Pressure to Wading

Tyre pressure may for example be reduced upon detection of wading so as to improve traction and footprint. The electronic tyre pressure monitoring system (TPMS) provides an electronic signal of real time tyre pressure, and a suitable release valve operated by e.g. radio or infrared signal may be provided on each vehicle wheel.

Change Steering Response/Feel

Many vehicles can in whole or in part adapt steering response and feel electronically. For example electric power assistance may be increased upon detection of wading, and or steering damping rates may be changed. This arrangement permits the vehicle to provide an unchanged steering response notwithstanding the commencement of wading. In other words the steering response and feel may resemble that of driving on dry land. Alternatively it may be desirable to deliberately introduce a variation of response and/or feel in order for example to prevent sudden or large steering wheel inputs.

Where an adjustable steering ratio is provided, the angle of steering wheel input and or rate of turning may change in relation to road wheel movement so as to improve driver control in water.

Change of Differential Control

Upon detection of wading, the control system may lock or provide limited slip in one or more differential gears of the vehicle in order to improve traction. Such locking may be in conjunction with a limitation of vehicle speed.

Torque Vectoring Control

Torque vectoring, that is to say wheel to wheel differentiation of driving torque, may be altered upon detection of wading to counter side slip of the vehicle or drift in a stream path. The control system may for example switch to an alternative torque vectoring map. Torque vectoring may be provided between wheels of each axle, or between individual wheels of each axle, or differentiate each wheel individually so as to best apply available drive torque.

Engine Lock Sensor

When wading there is a danger of water ingestion in the engine air inlet, and consequent damage due to a hydraulic lock in the engine cylinders. Upon detection of wading, an engine lock sensor may be enabled so as to switch off the engine upon detection of moisture in the engine inlet tract.

Any suitable moisture sensor may be used, typically in the air filter housing and optionally on the upstream side thereof. The moisture sensor will be able to distinguish from damp or humid air, and be sensitive to a threshold indicative of wading. The moisture sensor may detect accumulation of liquid in a trap within the air inlet tract. The engine lock sensor optionally re-enables the engine upon the moisture level falling below a pre-determined level.

Hybrid Vehicle Drive Mode

Upon detection of wading, the control system may be enabled to switch off an internal combustion engine, and so that the vehicles relies upon an alternative drive, such as an electric drive. Such an arrangement avoids the risk of water ingestion to the engine, whilst maintaining drive to the vehicle wheels. Suitable waterproofing of the alternative drive is of course required.

The control system may disable the internal combustion engine so that the alternative drive automatically takes over without further measures, or the control system may actively enable the alternative drive in a wading mode, which may for example limit vehicle speed, engage an alternative throttle map and make other desirable changes to vehicle response.

HVAC System

Upon detection of wading the HVAC system may start or switch to a wading mode which is best suited to air with a high moisture content. Thus the HVAC system may immediately enable electrically heated screens, in particular the windscreen, and may blow air over the screens in de-misting mode. The air-conditioning system may be engaged or enabled to blow a high volume of dry air over the interior of the screens, so as to prevent misting and to clear the screens of moisture.

The HVAC system may also switch to a higher level air inlet, so as to limit the risk of moisture/water ingestion.

Engine Fuel Saving Mode

Upon detection of wading, an engine fuel saving mode may be deactivated so as to minimize the risk of stranding in water. Thus a vehicle may have a fuel saving mode which normally turns off a vehicle engine when the vehicle is stationary, and for example restarts the engine automatically upon throttle pedal movement. This strategy can be temporarily disabled during wading so as to avoid any risk of the vehicle engine failing to re-start in water, and to give confidence to the driver that control of the vehicle is being maintained.

Particle Filter Regeneration

Many internal combustion engines have a particle filter in the exhaust system, which is periodically re-generated by raising the temperature thereof to cause combustion of the contents. Regeneration occurs when required, for example by reference to increasing back pressure, and may be temporarily suspended upon detection of wading. The control system for example flags the engine control unit to block regeneration during the wading event, and thereby avoid the engine working in a temporarily adjusted mode, avoid unnecessary thermal shock to the particle filter and/or exhaust system, and avoid the risk of incomplete regeneration. Regeneration is generally indicated when the particle filter is at rather less than full capacity, and accordingly there is no significant disadvantage in delaying regeneration during a wading event.

Partially Flood Vehicle

Sealed vehicles may become dangerously buoyant when wading as the water level reaches the underside of the vehicle body. Accordingly it may be desirable to raise the vehicle body with respect to the wheels upon detection of wading, and this is a useful solution where adjustable height suspension is fitted to the vehicle. Raising the vehicle ride height reduces the buoyancy effect and increases traction between the wheels and the ground.

The buoyancy effect may also be countered by partially flooding the vehicle upon detection of wading, in particular detection of wading at a pre-determined depth of water. The vehicle may for example be fitted with actuators to open flaps to admit water into normally closed compartments of the vehicle, such as a spare wheel well. One or more vehicle doors may be unlatched to admit water into the interior of the vehicle body—for example to allow flooding of the vehicle floor. Controlled ingress of water into such compartments or the vehicle cabin increases the weight of the vehicle, thereby reducing buoyancy and increasing vehicle traction.

Unlock Doors and Open Sunroof

Upon detection of wading the control system may also automatically unlock one or more vehicle doors and open one or more windows and/or the or each sunroof (if fitted) so as to permit the occupants a ready means of escape in the event of difficulty. For example upon sudden entry of deeper water there may be a risk of an unpredicted engine malfunction, loss of traction and the like, as a consequence of which the occupants may require to escape quickly. This aspect of the invention places the vehicle in escape ready mode, without substantially increasing the risk of water entering the vehicle body in an uncontrolled manner.

In all of the aforementioned aspects, the control system may be arranged to re-enable the relevant vehicle protocols when wading is no longer detected. Implementation may be partial or progressive depending upon the control strategy. Thus, for example, headlights may be immediately returned to normal operation, whereas the HVAC system may resume normal operation gradually.

In some cases the severity of the control system protocol may be dependent upon the sensed wading depth. Thus upon sensing a minimum wading depth some changes of vehicle state will automatically be implemented, for example unlocking doors. Other vehicle states may progressively move to a more altered state depending on water depth, for example change of steering response and feel.

Not all actions need be implemented at the same wading depth, provided that several wading depths can be indicated to the control system. Thus partial vehicle flooding will not be implemented until deep water is encountered, whereas change of throttle mapping may occur at a much lower depth of water.

In each case an action consequent upon wading may be indicated to the driver via the HMI (Human-Machine Interface). This may be in the form of a graphic, for example headlights-on indicator, or in the form of a message, for example 'low range engaged'.

BRIEF DESCRIPTION OF THE DRAWINGS

Embodiments of the present invention will now be described, by way of example only, with reference to the accompanying FIGURES in which:

FIG. 1 is a schematic side view of a wading off-road vehicle according to embodiments of the present invention; the vehicle having a wading sensor and a wading depth sensor.

DETAILED DESCRIPTION

With reference to FIG. 1, a vehicle 10 has ultrasonic sensors 11, 12 of the parking distance type mounted in the front and rear bumpers and having respective output cones 13, 14. The sensors both transmit and receive, and are accordingly capable of being used in a system for detecting obstructions, for example bollard 15.

If immersed, the response of such a sensor will change, and can accordingly be used to sense wading at the depth of the sensor 11, 12. The response may for example exploit the different signal propagation speed for water and air, or the different diaphragm settling time for air and water immersion. Upon detection of wading, different vehicle control strategies may be implemented.

A high mounted parking distance sensor 16, 17, for example mounted on a bonnet or tailgate can be used to detect the ground surface by means of a downwardly directed output cone 18, 19.

The downward facing sensors 16, 17 also receive a reflection from the surface of water, and can thus be used to indicate depth of water since the mounting location on the vehicle is known in relation to ground level, or can be interpolated from a suspension height sensor of a variable height suspension.

Front and rear mounted sensors allow detection for both forward and rearward vehicle motion, and can also give an indication of vehicle inclination.

Other means of detecting wading and depth of wading may be used.

In one embodiment the vehicle 10 may comprise a change of terrain response mode; the vehicle 10 may have off-road capability and may have a driver switchable control for automatically placing the vehicle 10 in best operating mode according to the terrain over which the vehicle 10 is travelling. Thus a driver may be able to switch between road, mud and snow, sand, and rock crawl modes, each of which will modify the vehicle response so as to enable the vehicle 10 to best perform within the full available operating envelope.

Upon detection of wading, the control system may automatically implement a terrain response mode, such as rock crawl. This arrangement provides better vehicle performance for the inexperienced driver, and may protect the vehicle 10 from damage. The cost of implementation is minimal where terrain response functionality is already provided on the vehicle 10.

In an alternative embodiment, the control system may present the driver with a choice of modes, for example rock crawl and sand, or default to the best mode indicated by other vehicle sensors. For example wheel slip sensors may provide information on wheel grip, and thus whether rock climb mode or mud and snow mode is appropriate. The control system may include a driver override.

In another embodiment the vehicle 10 may comprise an apparatus which allows the throttle mapping to be changed, the apparatus may vary the vehicle response to a users request when pressing the accelerator or throttle pedal of the vehicle 10. Upon detection of wading, the control system may implement a throttle map better suited to driving in water. Thus, to permit better control of engine revolutions, the throttle map may limit maximum engine revolutions and/or increase throttle pedal travel for a given engine response. Minimum engine speed may be raised to ensure positive exhaust pressure whilst under water.

In yet another embodiment the vehicle 10 may comprise an apparatus which controls or restricts the selection of the gears provided in the vehicles gearbox. Upon detection of wading the control system may inhibit the selection of certain gear ratios, alter the speeds at which automatic ratio changes occur, or select an appropriate (low) ratio. This arrangement can avoid loss of drive as gear ratios change, or are changed, during wading, and also promotes driver confidence. An indicator to the driver may show, for example, a locked or selected gear ratio.

In still another embodiment the vehicle 10 may comprise an apparatus which controls or limits selection of high gear ratio and/or low gear ratio mode in a vehicle 10 having a dual range transmission. Similarly a manual or automatic change of speed range may be inhibited or prohibited, or a range may be automatically selected, typically low range in a dual range transmission.

In an alternative embodiment the vehicle 10 may comprise headlights and an apparatus which allows the headlights to be activated upon detection of wading.

In a further embodiment, the vehicle 10 may comprise an additional air intake for providing air to the engine and/or vehicle cabin, which intake comprises orifice located at a higher elevation with respect to the vehicle body, an apparatus may be provided which enables selection of the higher air intake. Upon detection of wading, a higher air intake path may be selected for the engine and/or HVAC system. The intake path may for example comprise upper and lower paths and an electronically controlled flap or butterfly valve to select one or other path on demand. This may be advantageous if the lower intake path is submerged below water, since air can still be provided to the vehicle cabin and/or engine.

In yet a further embodiment, the vehicle 10 may comprise an electronic tyre pressure monitoring system (TPMS) and a suitable release valve for adapting the tyre pressure. The tyre pressure may for example be reduced upon detection of wading so as to improve traction and footprint, the surface area of the vehicle in contact with the ground; this may reduce or prevent sinking into a soft surface on which the vehicle 10 is travelling. The electronic tyre pressure monitoring system (TPMS) provides an electronic signal of real time tyre pressure, and a suitable release valve operated by e.g. radio or infrared signal may be provided on each vehicle wheel.

In still a further embodiment, the vehicle 10 may comprise an adaptive steering system capable of adjusting the response of the steering following a user demand or feel the feel of the steering experienced by the user. The vehicles may adapt in whole or in part steering response and feel electronically. For example electric power assistance may be increased upon detection of wading, and or steering damping rates may be changed. This arrangement permits the vehicle 10 to provide an unchanged steering response notwithstanding the commencement of wading. In other words the steering response and feel may resemble that of driving on dry land. Alternatively it may be desirable to deliberately introduce a variation of response and/or feel in order for example to prevent sudden or large steering wheel inputs.

Where an adjustable steering ratio is provided, the angle of steering wheel input and or rate of turning may change in relation to road wheel movement so as to improve driver control in water.

In an alternative embodiment the vehicle 10 may comprise a system for controlling a one or more differential gearboxes. Upon detection of wading, the control system may lock or provide limited slip in one or more differential gears of the vehicle 10 in order to improve traction. Such locking may be in conjunction with a limitation of vehicle speed.

In another embodiment the vehicle 10 may comprise a system for controlling the torque delivered to the wheels. Torque vectoring, that is to say wheel to wheel differentiation of driving torque, may be altered upon detection of wading to counter side slip of the vehicle 10 or drift in a stream path. The control system may for example switch to an alternative torque vectoring map. Torque vectoring may be provided between wheels of each axle, or between individual wheels of each axle, or differentiate each wheel individually so as to best apply available drive torque.

In some embodiments the vehicle 10 may comprises a water ingestion sensor. When wading there is a danger of water ingestion in the engine air inlet, and consequent damage due to a hydraulic lock in the engine cylinders. Upon detection of wading, an engine lock may be enabled so as to switch off the engine upon detection of moisture in the engine inlet tract. Any suitable moisture sensor may be used, typically in the air filter housing and optionally on the upstream side thereof. The moisture sensor will be able to distinguish from damp or humid air, and be sensitive to a threshold indicative of wading. The moisture sensor may detect accumulation of liquid in a trap within the air inlet tract. The control system optionally re-enables the engine upon the moisture level falling below a pre-determined level.

In some embodiments the vehicle 10 may comprises an alternative drive mechanism such as an electric drive system as found in hybrid vehicles. Upon detection of wading, the control system may be enabled to switch off an internal combustion engine, and so that the vehicle relies upon an alternative drive, such as an electric motor. Such an arrangement avoids the risk of water ingestion to the engine, whilst maintaining drive to the vehicle wheels. Suitable waterproofing of the alternative drive may be required.

The control system may disable the internal combustion engine so that the alternative drive automatically takes over without further measures, or the control system may actively enable the alternative drive in a wading mode, which may for example limit vehicle speed, engage an alternative throttle map and make other desirable changes to vehicle response.

In other embodiments the control system may be coupled to a heating, ventilation, and air conditioning (HVAC) System provided on the vehicle 10. Upon detection of wading the HVAC system may start or switch to a wading mode which is best suited to air comprising a high moisture content. Thus the HVAC system may immediately enable electrically heated screens, in particular the windscreen, and may blow air over the screens in de-misting mode. The air-conditioning system may be engaged or enabled to blow a high volume of dry air over the interior of the screens, so as to prevent misting and to clear the screens of moisture.

The HVAC system may also switch to a higher level air inlet, so as to limit the risk of moisture/water ingestion.

In a further embodiment the vehicle 10 may comprise a fuel saving mode which in normal operation turns off a vehicle engine when the vehicle 10 is stationary for a predefined period of time. Thus a vehicle 10 may have a fuel saving mode which turns off the vehicles engine when the vehicle 10 is stationary, and restarts the engine automatically for example upon detection of movement of the throttle pedal. Upon detection of wading, an engine fuel saving mode may be deactivated so as to minimize the risk of the vehicle becoming stranded in water. This fuel saving strategy can be temporarily disabled during wading so as to avoid any risk of the vehicle engine failing to re-start in water, and to give confidence to the driver that control of the vehicle 10 is being maintained.

Many internal combustion engines have a particle filter in the exhaust system, which is periodically re-generated by raising the temperature thereof to cause combustion of the contents. Regeneration occurs when required, for example by reference to increasing back pressure, and may be temporarily suspended upon detection of wading. In an embodiment comprising a particle filter which can be regenerated, the control system may instruct the engine control unit to block regeneration during the wading event, and thereby avoid a situation in which the engine is working in a temporarily adjusted mode, this would help avoid unnecessary thermal shock to the particle filter and/or exhaust system, and avoid the risk of incomplete regeneration. Regeneration is generally indicated when the particle filter is at rather less than full capacity, and accordingly there is no significant disadvantage in delaying regeneration during a wading event.

Sealed vehicles may become dangerously buoyant when wading as the water level reaches the underside of the vehicle body. Accordingly it may be desirable in some embodiments to raise the vehicle body with respect to the wheels upon detection of wading, and this is a useful solution where adjustable height suspension is fitted to the vehicle 10. Raising the vehicle ride height reduces the buoyancy effect and increases traction between the wheels and the ground.

Alternatively, the buoyancy effect may also be countered by partially flooding the vehicle 10 upon detection of wading, in particular detection of wading at a pre-determined depth of water. The vehicle 10 may for example be fitted with actuators to open flaps to admit water into normally closed compartments of the vehicle 10, such as a spare wheel well. One or more vehicle doors may be unlatched to admit water into the interior of the vehicle body—for example to allow flooding of the vehicle floor. Controlled ingress of water into such compartments or the vehicle cabin increases the weight of the vehicle 10, thereby reducing buoyancy and increasing vehicle traction.

In yet another embodiment the control system is coupled to the vehicle locking system and/or configured to interact with a sunroof. Upon detection of a wading event the control system may automatically unlock one or more of the vehicle's doors, one or more of the vehicle's windows and/or open the or each sunroof (if fitted) so as to permit the occupants a ready means of escape in the event of difficulty. For example upon sudden entry of deeper water there may be a risk of an unpredicted engine malfunction, loss of traction and the like, as a consequence of which the occupants may require to escape quickly. This embodiment places the vehicle 10 in escape ready mode, without substantially increasing the risk of water entering the vehicle body in an uncontrolled manner.

The above embodiments may be combined, as desired.

In all of the aforementioned embodiments, the control system may be arranged to re-enable the relevant vehicle protocols when wading is no longer detected. Implementation may be partial or progressive depending upon the control strategy. Thus, for example, headlights may be immediately returned to normal operation, whereas the HVAC system may resume normal operation gradually.

In some cases the severity of the control system protocol may be dependent upon the sensed wading depth. Thus upon sensing a minimum wading depth some changes of vehicle state will automatically be implemented, for example unlocking doors. Other vehicle states may progressively move to a more altered state depending on water depth, for example change of steering response and feel.

Not all actions need be implemented at the same wading depth, provided that several wading depths can be indicated to the control system. Thus partial vehicle flooding will not be implemented until deep water is encountered, whereas change of throttle mapping may occur at a much lower depth of water.

In each case an action consequent upon wading may be indicated to the driver via the HMI (Human-Machine Interface). This may be in the form of a graphic, for example headlights-on indicator, or in the form of a message, for example 'low range engaged'.

The present application claims priority to UK patent application numbers filed by the present applicant on 15 Dec. 2010 having the application numbers GB1021268.6, GB1021278.5, GB1021272.8, GB1021297.5, GB1021295.9 and GB1027296.7, the contents of each of which are expressly incorporated by reference in their entirety.

The present application is related to the PCT applications, filed concurrently with the present application, and naming at least one inventor in common with the present application, which are listed below:

1. PCT application No. PCT/EP2011/072998 to Thuy-Yung TRAN and Edward HOARE filed 15 Dec. 2011, entitled "Ultrasonic Wading Detection System for a Vehicle";
2. PCT application No. PCT/EP2011/072999 to Thuy-Yung TRAN and Edward HOARE, filed 15 Dec. 2011, entitled "Wading Detection System for a Vehicle";
3. PCT application No. PCT/EP2011/072997 to Thuy-Yung TRAN, Edward HOARE and Nigel CLARKE, filed 15 Dec. 2011, entitled "Wading Depth Estimation for a Vehicle";
4. PCT application No. PCT/EP2011/072988 to "Thuy-Yung TRAN, Edward HOARE and Nigel CLARKE", filed 15 Dec. 2011, entitled "Wading Vehicle Depth Measurement Apparatus";
5. PCT application No. PCT/EP2011/072990 to Thuy-Yung TRAN, Edward HOARE and Nigel CLARKE, filed 15 Dec. 2011, entitled "Vehicle Orientation Device and Method";
6. PCT application No. PCT/EP2011/072991 to Thuy-Yung TRAN, Edward HOARE and Nigel CLARKE, filed 15 Dec. 2011, entitled "Wading Vehicle Depth Measurement Apparatus";
7. PCT application No. PCT/EP2011/072992 to Thuy-Yung TRAN, Edward HOARE, Anthony JONES, Simon THOMSON and Ashutosh TOMAR, filed 15 Dec. 2011, entitled "Wading Vehicle Water Level Display";
8. PCT application No. PCT/EP2011/072994 to Thuy-Yung TRAN, Edward HOARE, Anthony JONES, Simon THOMSON and Ashutosh TOMAR, filed 15 Dec. 2011, entitled "Wading Vehicle Water Level Display";
9. PCT application No. PCT/EP2011/072996 to Thuy-Yung TRAN, Edward HOARE, Anthony JONES, Simon THOMSON and Ashutosh TOMAR, filed 15 Dec. 2011, entitled "Wading Vehicle Advisory Speed Display".

The contents of the above referenced PCT applications (and corresponding UK applications, filed concurrently and having the same ownership, inventorship and Title as the above listed PCT applications) are hereby expressly incorporated by reference in their entirety into the present application.

The invention claimed is:

1. A land based vehicle comprising a control system for aiding control of the vehicle when the vehicle is wading, the vehicle having a sensor adapted to indicate that the vehicle is wading in water having a depth above a pre-determined depth of water, said control system being configured to automatically implement one or more control strategies in dependence upon detection by the sensor of wading of the vehicle in water having a depth above the pre-determined depth to aid in the control of the vehicle when the vehicle is wading, said vehicle control strategies being selected from a group consisting of:
    change of traction mode;
    change of throttle mapping;
    change of high/low range mode;
    change steering response/feel;
    change differential control for improving traction;
    change torque-vectoring control;
    delay regeneration of exhaust particle filter; and
    partially flood a pre-determined portion of the vehicle.

2. A vehicle according to claim 1 wherein the control system is configured to be automatically disabled.

3. A vehicle according to claim 1 wherein the control system according to claim 2 is arranged to automatically resume a standard control strategy upon failure to detect wading by said sensor.

4. A vehicle according to claim 1 further comprising a plurality of sensors adapted to indicate wading above a pre-determined depth of water operable individually or in combination to detect wading, wherein said control system is adapted to implement a control strategy selected in dependence on several of said sensors indicating wading.

5. A vehicle according to claim 1 wherein the control system is arranged to implement said one or more of said control strategies immediately upon detection of wading.

6. A vehicle according to claim 1 wherein the control system according to claim 1 is arranged to implement one or more of said control strategies after a predetermined time delay.

7. A vehicle according to claim 6 wherein the time delay is dependent upon the strategy to be implemented.

8. A vehicle according to claim 1 wherein the control system is arranged to implement one or more of said control strategies progressively.

9. A vehicle according to claim 8 wherein a rate of change of progressive implementation of one or more control strategies is dependent upon the control strategy to be implemented.

10. A vehicle according to claim 1 further comprising a wading depth sensor, said control system being responsive to said wading depth sensor to implement one or more of said control strategies in dependence upon wading depth, and wherein the control system is arranged to vary one or more of said control strategies according to step changes in wading depth.

11. A vehicle according to claim 1 wherein said control strategies are defined in a read only memory.

12. A vehicle according to claim 1 wherein the control system implements a control strategy which is dependent upon a mode of operation of the vehicle.

13. A control system for a vehicle for aiding control of the vehicle when the vehicle is wading in water having a depth above a pre-determined depth of water, said control system being configured to automatically implement one or more vehicle control strategies in dependence upon detection of wading of the vehicle in water having a depth above the pre-determined depth by a wading sensor of the vehicle, said vehicle control strategies being selected from a group consisting of:
    change of traction mode;
    change of throttle mapping;

change of high/low range mode;
change steering response/feel;
change differential control for improving traction;
change torque-vectoring control;
delay regeneration of exhaust particle filter; and
partially flood a pre-determined portion of the vehicle.

14. A method for aiding control of a wading vehicle comprising: receiving data from a sensor adapted to indicate evading of the vehicle in water having a depth above a pre-determined depth, of water; determining that the vehicle is wading in water having a depth above the pre-determined depth; and automatically implementing one or more control strategies in response to determining that the vehicle is wading in water having a depth above the pre-determined depth, said one or more vehicle control strategies being selected from a group consisting of:

change of traction mode;
change of throttle mapping;
change of high/low range mode;
change steering response/feel;
change differential control;
change torque-vectoring control;
delay regeneration of exhaust particle filter; and
partially flood a pre-determined portion of the vehicle.

15. A method according to claim 14 wherein determining that the vehicle is wading comprises receiving data from a sensor adapted to detect a wading condition of the vehicle.

16. A method according to claim 14, further comprising receiving data from a sensor adapted to detect a wading condition of the vehicle, determining that the vehicle is not wading in dependence on said data, and resuming, automatically, a standard or different control strategy.

17. A vehicle according to claim 1 wherein the one or more vehicle control strategies implemented by the control system comprises a change in the torque-vectoring control to counter (a) side slip of the vehicle, (b) drift in a stream path, or (c) both the side slip of the vehicle and the drift in a stream path.

\* \* \* \* \*